US011390974B2

(12) United States Patent
Matsubara et al.

(10) Patent No.: US 11,390,974 B2
(45) Date of Patent: Jul. 19, 2022

(54) EMBROIDERY FRAME

(71) Applicant: JANOME SEWING MACHINE CO., LTD., Hachioji (JP)

(72) Inventors: Shotaro Matsubara, Hachioji (JP); Ushio Yokoyama, Hachioji (JP)

(73) Assignee: JANOME CORPORATION, Tokyo (JP)

( * ) Notice: Subject to any disclaimer, the term of this patent is extended or adjusted under 35 U.S.C. 154(b) by 12 days.

(21) Appl. No.: 16/877,660

(22) Filed: May 19, 2020

(65) Prior Publication Data

US 2020/0407900 A1    Dec. 31, 2020

(30) Foreign Application Priority Data

Jun. 27, 2019  (JP) .............................. JP2019-119938

(51) Int. Cl.
*D05C 9/04* (2006.01)
*F16B 2/18* (2006.01)

(52) U.S. Cl.
CPC ................ *D05C 9/04* (2013.01); *F16B 2/185* (2013.01)

(58) Field of Classification Search
CPC ... D05C 9/04; D05C 1/02; D05C 1/04; D05B 39/00; D05B 39/005; D05B 91/10; F16B 2/18; F16B 2/185; Y10T 403/595; Y10T 403/7071
See application file for complete search history.

(56) References Cited

U.S. PATENT DOCUMENTS

| 3,159,393 | A | * | 12/1964 | Villano | ................... | E04G 17/00 |
|           |   |   |         |         |                     | 269/49      |
| 3,818,620 | A | * | 6/1974  | Field   | ....................... | D05C 1/04 |
|           |   |   |         |         |                     | 38/102.2    |
| 6,212,800 | B1 | * | 4/2001 | Bagley  | ..................... | D05C 1/02 |
|           |   |   |         |         |                     | 38/102.1    |

(Continued)

FOREIGN PATENT DOCUMENTS

| DE | 102004040434 B3 | * | 4/2006 | ............ F16G 11/101 |
| DE | 102008059852 A1 | * | 6/2010 | ........... H05K 7/1412 |

(Continued)

OTHER PUBLICATIONS

Husqvarnaviking, Hoops (Episode 4), Dec. 28, 2015, https://www.youtube.com/watch?v=fN9MoOYsGjo (last accessed Aug. 26, 2020). (Year: 2015).*

*Primary Examiner* — Alissa L Hoey
*Assistant Examiner* — Patrick J. Lynch
(74) *Attorney, Agent, or Firm* — WHDA, LLP

(57) ABSTRACT

An embroidery frame includes an inner frame formed like a hoop and an outer frame that has a separation section at which the outer frame is separated so as to form a first end portion and a second end portion that oppose each other. The outer frame is configured to nip an embroidery object, in collaboration with the inner frame, from outside the inner frame. The embroidery frame also includes an opening-closing mechanism configured to adjust a clearance of the separation section. In the embroidery frame, the opening-closing mechanism has a connection shaft that connects the first end portion and the second end portion to each other and also has a manipulation member that is rotatably mounted on the connection shaft with a center of rotation being positioned at the first end portion.

16 Claims, 9 Drawing Sheets

(56) References Cited

U.S. PATENT DOCUMENTS

| | | | |
|---|---|---|---|
| 6,231,266 B1* | 5/2001 | Gott | F16B 2/185 |
| | | | 403/338 |
| 6,760,985 B2* | 7/2004 | Wilson | D05C 1/04 |
| | | | 38/102.2 |
| 2002/0046687 A1* | 4/2002 | Kato | D05C 9/04 |
| | | | 112/103 |
| 2010/0139205 A1* | 6/2010 | Testu | E04H 3/16 |
| | | | 52/706 |
| 2012/0090519 A1* | 4/2012 | Fukao | D05C 9/04 |
| | | | 112/103 |
| 2020/0407901 A1* | 12/2020 | Ueda | D05C 9/04 |

FOREIGN PATENT DOCUMENTS

| | | |
|---|---|---|
| JP | 7-15793 U | 3/1995 |
| JP | 2008-279184 A | 11/2008 |

\* cited by examiner

EMBROIDERY FRAME

BACKGROUND OF THE INVENTION

1. Field of the Invention

The present invention relates to an embroidery frame to be mounted on a sewing machine having an embroidering function and more specifically to an embroidery frame that can maintain a temporarily tightened state when an embroidery object is nipped by inner and outer frames of the embroidery frame.

2. Description of the Related Art

Two methods are typically available for an embroidery frame to hold an embroidery object (i.e., a piece of cloth), in other words, an upper-and-lower-frame method in which the embroidery object is nipped by upper and lower frames and an inner-and-outer-frame method in which the embroidery object is nipped by inner and outer frames. An advantage of the upper-and-lower-frame method is that a load imposed on the embroidery object is not great and creases are not generated easily because the embroidery object is held on a horizontal surface. However, it is necessary to press the upper frame and the lower frame strongly against each other in order to prevent the embroidery object from slipping. Accordingly, the upper-and-lower-frame method requires a large-scale mechanism and is adopted in commercial production, whereas the inner-and-outer-frame method is normally adopted in home-use systems.

In the inner-and-outer-frame method, an inner frame and an outer frame are formed into a substantially annular or rectangular shape and are configured such that the outer periphery of the inner frame or the inner periphery of the outer frame is pressed against the other frame, thereby nipping an embroidery object between the inner and outer frames.

For example, a known embroidery frame has such a structure that the inner frame is formed as one piece and the outer frame is formed so as to have at least one separation section and is fitted around the inner frame from outside (see Japanese Unexamined Utility Model Registration Application Publication No. 7-15793). This embroidery frame also has an opening-closing mechanism at the separation section for increasing and decreasing the clearance of the separation section. More specifically, the opening-closing mechanism includes a tightening screw for pushing an end of the outer frame at the separation section, and turning the tightening screw decreases the inner peripheral length of the outer frame, which produces pressing forces acting on the outer periphery of the inner frame.

Another known embroidery frame for a sewing machine also holds an embroidery object by decreasing the inner peripheral length of the outer frame (see Japanese Unexamined Patent Application Publication No. 2008-279184). This embroidery frame has another type of opening-closing mechanism for widening and narrowing the separation section. This opening-closing mechanism includes a manipulation lever that has cam surfaces. The manipulation lever can widen or narrow the separation section easily compared with the tightening screw system. This opening-closing mechanism also includes an adjustment nut disposed at a position opposite to the manipulation lever at the separation section. The adjustment nut also enables the inner peripheral length of the outer frame to be adjusted.

The embroidery frame disclosed in Japanese Unexamined Utility Model Registration Application Publication No. 7-15793 is advantageous in that the clearance of the separation section can be adjusted steplessly and the embroidery frame can create a "temporarily tightened state" along with a "released state" and a "fully tightened state". In the "fully tightened state", a piece of cloth is held firmly without slipping, whereas in the "released state", the piece of cloth can be removed. In "temporarily tightened state", tension and position of the piece of cloth can be adjusted finely. However, an improvement in workability is still desired for this embroidery frame because every time a piece of cloth is set in the embroidery frame, it is necessary to turn the tightening screw many times to switch from the "released state" to the "fully tightened state".

On the other hand, the embroidery frame disclosed in the Japanese Unexamined Patent Application Publication No. 2008-279184 can be switched efficiently from the "released state" to the "fully tightened state" by using the manipulation lever that can widen and narrow the separation section easily. However, in order to create the "temporarily tightened state", it is necessary to loosen the adjustment nut, or it is necessary to hold the manipulation lever temporarily by hand when the manipulation lever is positioned halfway from the "released state" to the "fully tightened state".

Once the adjustment nut is loosened for adjustment of cloth position, the adjustment nut must be tightened again to cause the embroidery frame to assume the "fully tightened state", which does not improve the workability. If the manipulation lever is held with one hand for adjustment of cloth position, it becomes difficult to set the piece of cloth smoothly in the embroidery frame with the other hand.

SUMMARY OF THE INVENTION

Accordingly, it is an object of the present invention to provide an embroidery frame that can maintain a temporarily tightened state, between a released state and a fully tightened state, in which for example, the position of an embroidery object can be adjusted finely.

According to an aspect of the present invention, an embroidery frame includes an inner frame formed like a hoop, an outer frame that has a separation section at which the outer frame is separated so as to form a first end portion and a second end portion that oppose each other. The outer frame is configured to nip an embroidery object, in collaboration with the inner frame, from outside the inner frame. The embroidery frame also includes an opening-closing mechanism configured to adjust a clearance of the separation section. In the embroidery frame, the opening-closing mechanism has a connection shaft that connects the first end portion and the second end portion to each other and also has a manipulation member that is rotatably mounted on the connection shaft with a center of rotation being positioned at the first end portion. The manipulation member is configured to press the first end portion toward the second end portion and has three or more cam surfaces of which respective distances from the center of rotation are different.

In the embroidery frame, the connection shaft may have a rotation shaft hole formed in a portion of the connection shaft at the first end portion. The rotation shaft hole serves as the center of rotation of the manipulation member. The first end portion may have a cam receiving surface with which any one of the three or more cam surfaces comes into contact in response to rotation of the manipulation member. The first end portion may also have a first throughhole into which the portion of the connection shaft at the first end portion is inserted. In addition, the opening-closing mechanism may also have a position-adjusting member that is disposed in a portion of the connection shaft at the second end portion and is configured to move the connection shaft in an axial direction thereof.

In the embroidery frame, the connection shaft may have a thread formed on the portion of the connection shaft at the second end portion, and the position-adjusting member may have an adjustment nut that is screwed on the thread. Rotation of the adjustment nut moves the connection shaft in the axial direction thereof. In addition, the second end portion may have a second throughhole into which the portion of the connection shaft at the second end portion is inserted and may also have a cavity from which the adjustment nut is exposed. Moreover, the opening-closing mechanism may have an elastic body that is disposed so as to extend between the first end portion and the second end portion and that expands and contracts in a direction in which the clearance of the separation section changes.

For the purpose of adjusting the clearance of separation section of the outer frame that is separated into the first end portion and the second end portion at the separation section, the embroidery frame includes a connection shaft that connects the first end portion and the second end portion to each other and also includes a manipulation member that is rotatably mounted on the connection shaft with a center of rotation being positioned at the first end portion. The manipulation member is configured to press the first end portion toward the second end portion and has three or more cam surfaces of which respective distances from the center of rotation are different. Thus, the embroidery frame can maintain the temporarily tightened state, between the released state and the fully tightened state, in which for example, the position of the embroidery object can be adjusted finely.

In addition, the embroidery frame includes a position-adjusting member that also serves as the opening-closing mechanism. The position-adjusting member is disposed in a portion of the connection shaft at the second end portion and configured to move the connection shaft in an axial direction thereof. Thus, by manipulating the position-adjusting member, the clearance of separation section of the outer frame can be adjusted finely so as to fit the thickness of the embroidery object.

DESCRIPTION OF THE PREFERRED EMBODIMENT

An embroidery frame according to an embodiment of the present invention will be described with reference to the drawings. Note that in the following description, "up" and "down" are defined with respect to the vertical direction of the embroidery frame as illustrated in the perspective view of FIG. 1. Similarly, "front" and "rear" are defined with respect to a direction from lower left to upper right in FIG. 1, and "right" and "left" are defined with respect to a direction from lower right to upper left in FIG. 1.

Embodiment

Figure 1:
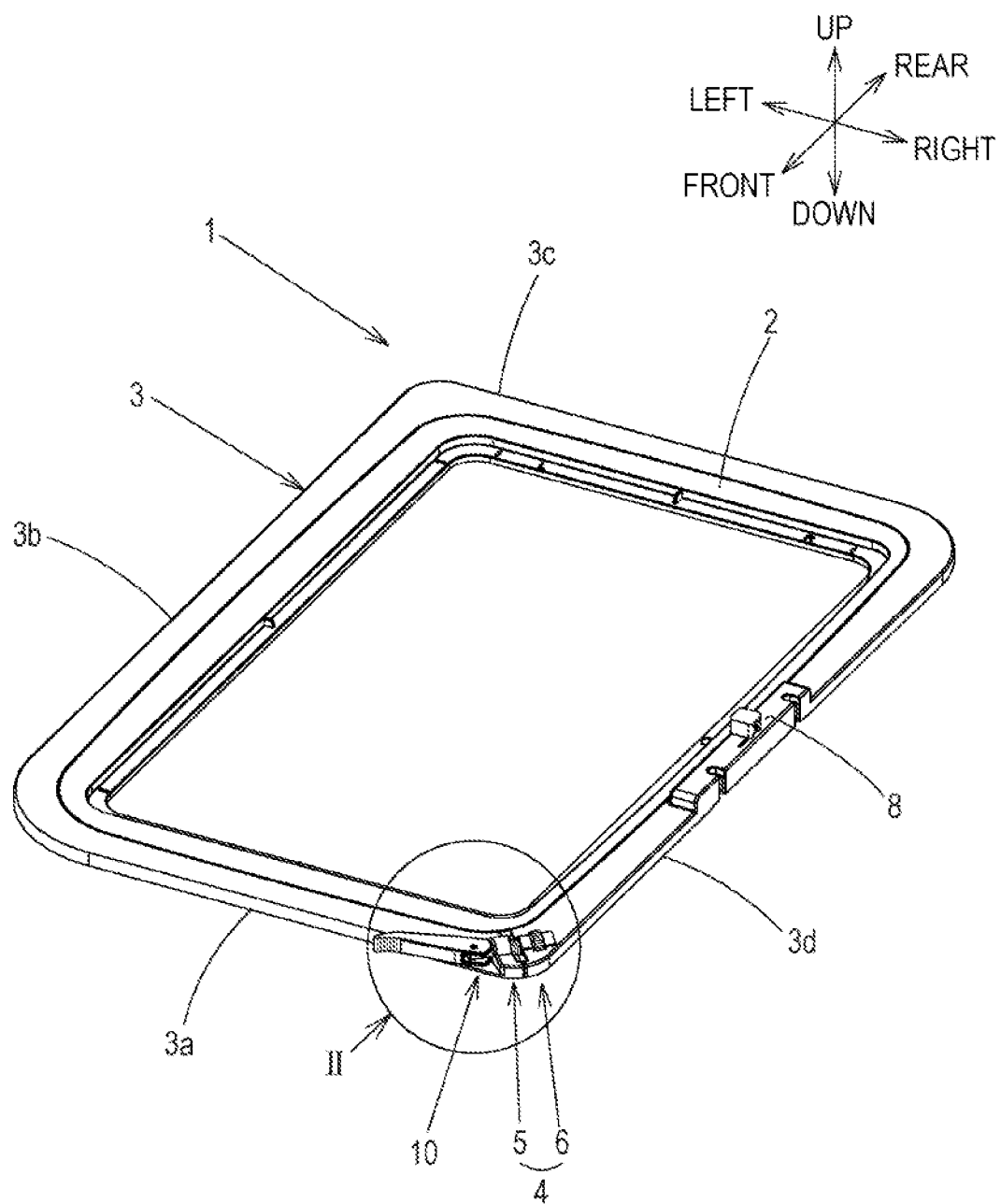
FIG. 1 is a perspective view illustrating an external appearance of an entire embroidery frame according to one embodiment of the present invention.

In FIG. 1, reference numeral 1 is an embroidery frame to be used when embroidered patterns are stitched with an embroidery machine, such as a sewing machine having an embroidering function or an automated embroidering machine. The embroidery frame 1 includes an inner frame 2, an outer frame 3, and an opening-closing mechanism 10. The inner frame 2 is formed like a hoop. The outer frame 3 has a separation section 4 at which the outer frame is separated so as to form a first end portion 5 and a second end portion 6 that oppose each other. The outer frame 3 is positioned outside the inner frame, and the outer frame 3 and the inner frame 2 nip an embroidery object (not illustrated). The opening-closing mechanism 10 adjusts a clearance S of the separation section 4.

As viewed in plan, the inner frame 2 is shaped like a rectangle or a square, and the outer periphery of the inner frame 2 is shaped so as to be able to hold the embroidery object. Note that although the inner frame 2 is shaped like a rectangle as viewed in plan in the present embodiment, the inner frame 2 may be shaped like a circle or an ellipse.

The outer frame 3 have four side portions, in other words, a front side portion 3a, a left side portion 3b, a rear side portion 3c, and a right side portion 3d. The inner periphery of the outer frame 3 is shaped so as to correspond to the outer peripheral shape of the inner frame 2 and so as to be able to hold an embroidery object in collaboration with the inner frame 2. Ribs 7 (only part of which is illustrated in FIG. 4A)

protrude inward from lower ends of respective inside surfaces of the front side portion 3a, the left side portion 3b, the rear side portion 3c, and the right side portion 3d of the outer frame 3. The ribs 7 are provided to define the lower position of the inner frame 2.

In the outer frame 3, a mounting portion 8 is formed on the upper surface of the right side portion 3d. The mounting portion 8 is detachably attached to an embroidery frame moving mechanism (not illustrated) of an embroidery machine. The embroidery frame moving mechanism moves the embroidery frame in X-Y directions in synchronization with the needle of the machine moving up and down. Note that the position at which the mounting portion 8 is disposed is not limited to the upper surface of the right side portion 3d. The mounting portion 8 may be disposed at any suitable position on the outer frame 3 as required.

Figure 2:
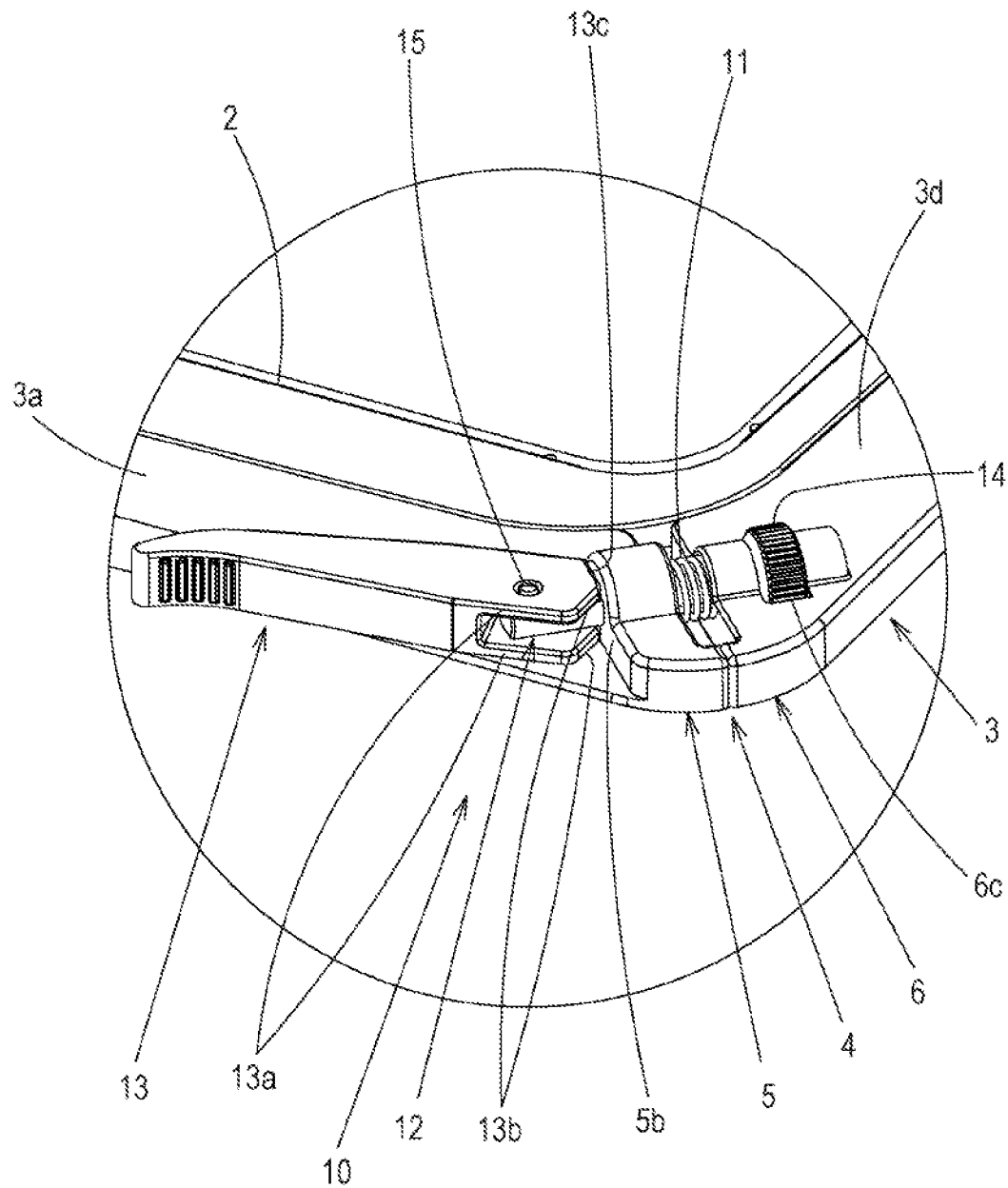
FIG. 2 is an enlarged perspective view illustrating part of the embroidery frame of FIG. 1.
Figure 3:
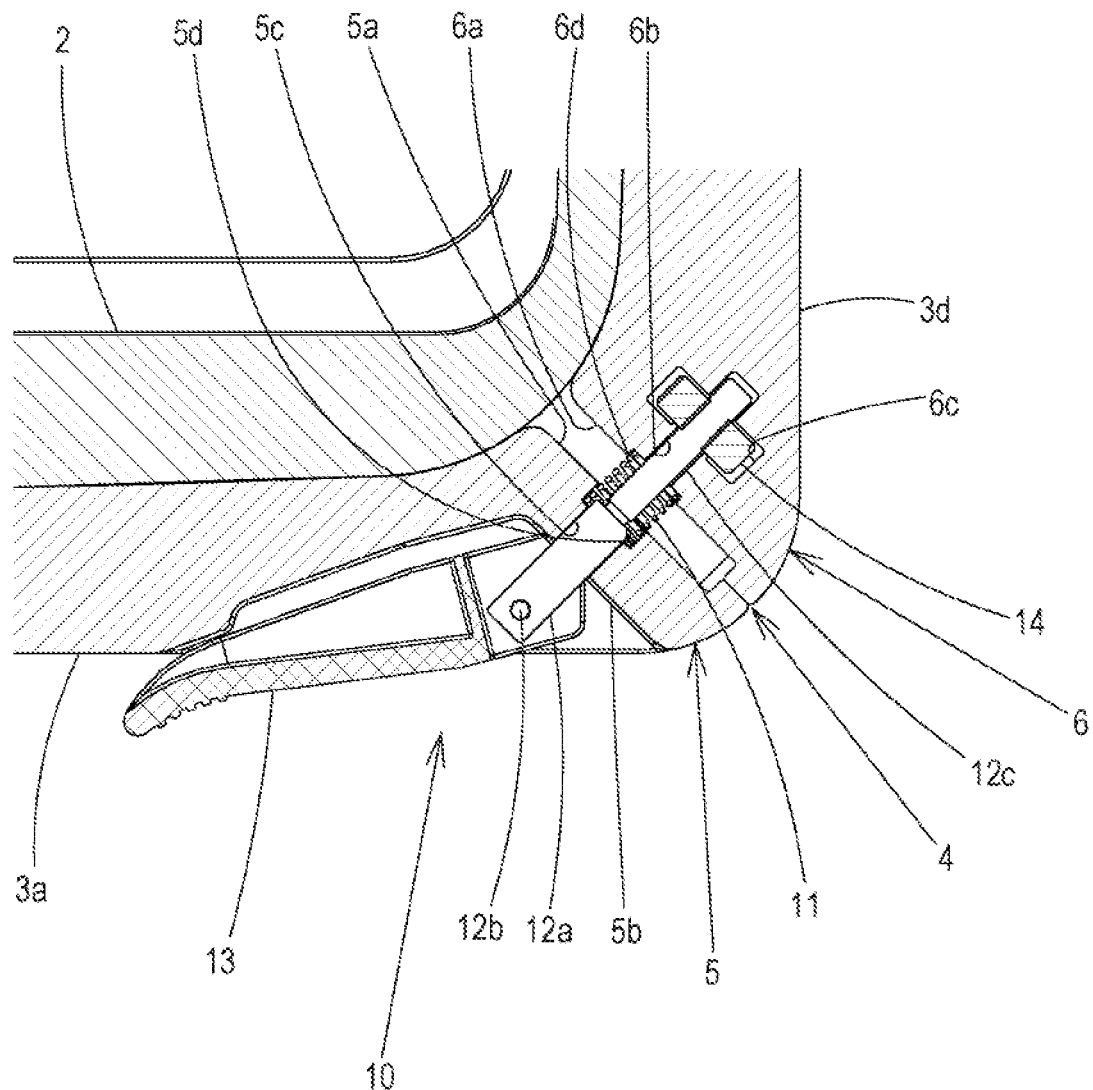
FIG. 3 is a cross section of the embroidery frame according to the embodiment of the present invention, which is taken along a horizontal plane that passes the central axis of a tightening screw.
Figure 4A:
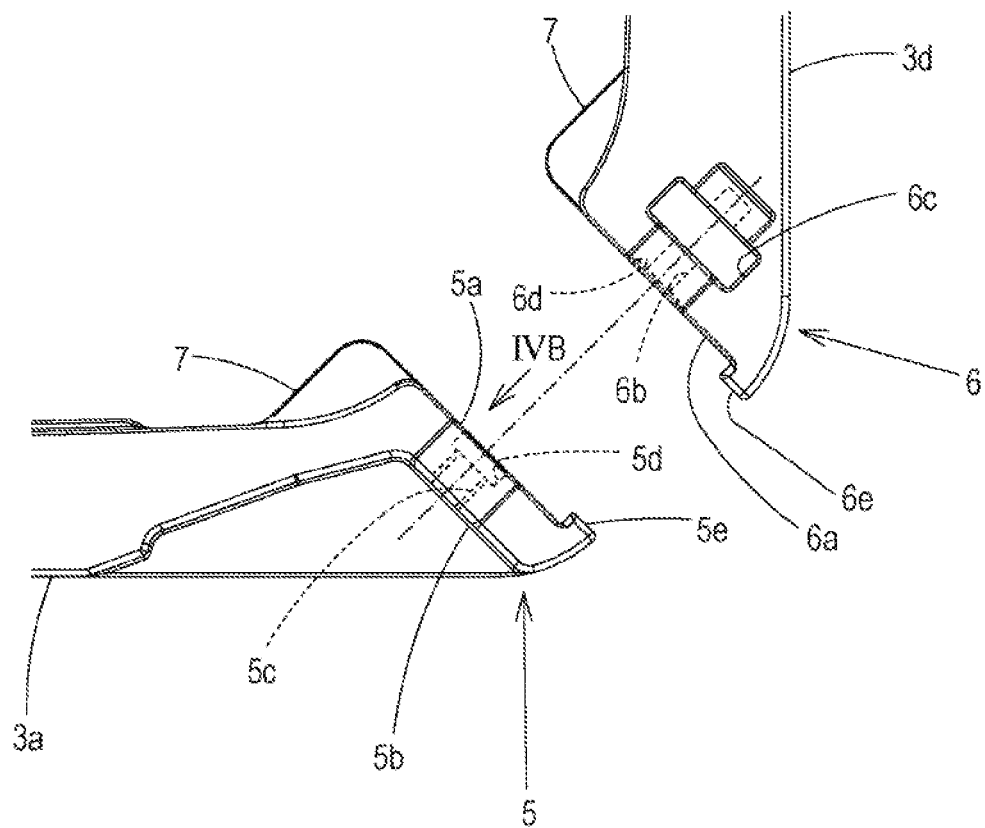
FIG. 4A is a plan view illustrating a separation section of the embroidery frame according to the embodiment of the present invention.

As illustrated in FIGS. 1 to 3 and in FIG. 4A, the outer frame 3 has one separation section 4 at which the first end portion 5 and the second end portion 6 are separated so as to oppose each other. As illustrated, the separation section 4 is provided at the corner at which the front side portion 3a and the right side portion 3d are connected. Note that in the present embodiment, the separation section 4 of the outer frame 3 is provided at the corner at which the front side portion 3a and the right side portion 3d are connected. However, it is sufficient to provide at least one separation section 4 at any suitable position in the outer frame 3. Moreover, multiple separation sections 4 may be provided if necessary.

The first end portion 5 that is formed near the front side portion 3a includes a first opposing surface 5a, a cam receiving surface 5b, a first throughhole 5c, a first counterbore 5d, and a first abutting portion 5e. The first opposing surface 5a opposes the second end portion 6. The cam receiving surface 5b is a surface that extends parallel to the first opposing surface 5a and with which cam surfaces 13a, 13b, and 13c of a releasing lever 13 are brought into contact (which will be described later). The first throughhole 5c is formed so as to extend in a direction normal to the first opposing surface 5a and the cam receiving surface 5b. The first counterbore 5d is formed in the first throughhole 5c at a position near the separation section 4 (near the first opposing surface 5a). The first counterbore 5d accommodates one end of a helical compression spring (release spring) 11 (which will be described later). The first abutting portion 5e is formed on the first opposing surface 5a at a position close to the outer periphery of the outer frame.

Figure 4B:
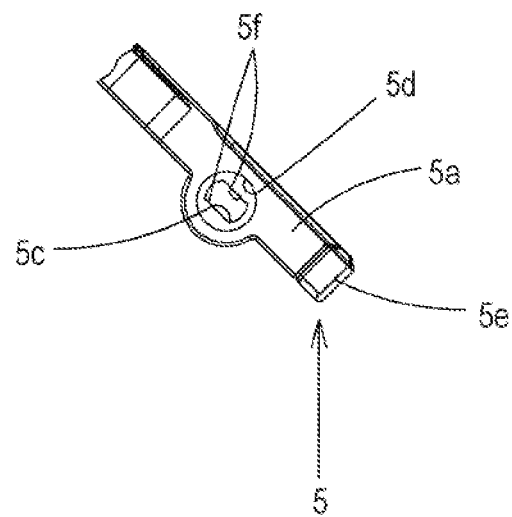
FIG. 4B is a side view illustrating the separation section of the embroidery frame according to the embodiment of the present invention as viewed in the direction of arrow IVB.

In addition, as illustrated in FIG. 4B, the cross section of the first throughhole 5c is not shaped like a circle but is shaped so as to have two flat surfaces 5f formed in vertical symmetry with respect to the center of the first throughhole 5c. The first throughhole 5c has such a cross-sectional shape that a rotation-prevention portion 12a of a tightening screw 12 can fit, which will be described later.

The second end portion 6 that is formed near the right side portion 3d includes a second opposing surface 6a, a second throughhole 6b, a cavity 6c, a second counterbore 6d, and a second abutting portion 6e. The second opposing surface 6a opposes the first end portion 5. The second throughhole 6b is formed so as to extend in a direction normal to the second opposing surface 6a and have a circular cross section. The cavity 6c is formed so as to cross the second throughhole 6b. The cavity 6c accommodates an adjustment nut 14 (to be described later) so as to expose the adjustment nut 14 to the outside. The second counterbore 6d is formed in the second throughhole 6b at a position near the separation section 4 (near the second opposing surface 6a). The second counterbore 6d accommodates the other end of the helical compression spring 11. The second abutting portion 6e is formed on the second opposing surface 6a at a position close to the outer periphery of the outer frame.

As illustrated in FIGS. 2 and 3, the opening-closing mechanism 10 includes a helical compression spring 11, a tightening screw 12, and a releasing lever 13. The helical compression spring 11 is an elastic body that is disposed so as to extend between the first counterbore 5d of the first end portion 5 and the second counterbore 6d of the second end portion 6. The helical compression spring 11 urges the first end portion 5 and the second end portion 6 so as to widen the clearance S of the separation section 4. The tightening screw 12, which serves as a connection shaft, is inserted in the first throughhole 5c formed in the first end portion 5 and also in the second throughhole 6b formed in the second end portion 6. The tightening screw 12 connects the first end portion 5 and the second end portion 6 to each other. The releasing lever 13, which serves as a manipulation member, is rotatably journaled to the tightening screw 12 with the center of rotation being positioned in the first end portion 5 and presses the cam receiving surface 5b of the first end portion 5. The outer frame 3 of the embroidery frame 1 assumes three different states, in other words, a released state, a temporarily tightened state, and a fully tightened state.

Figure 5A:
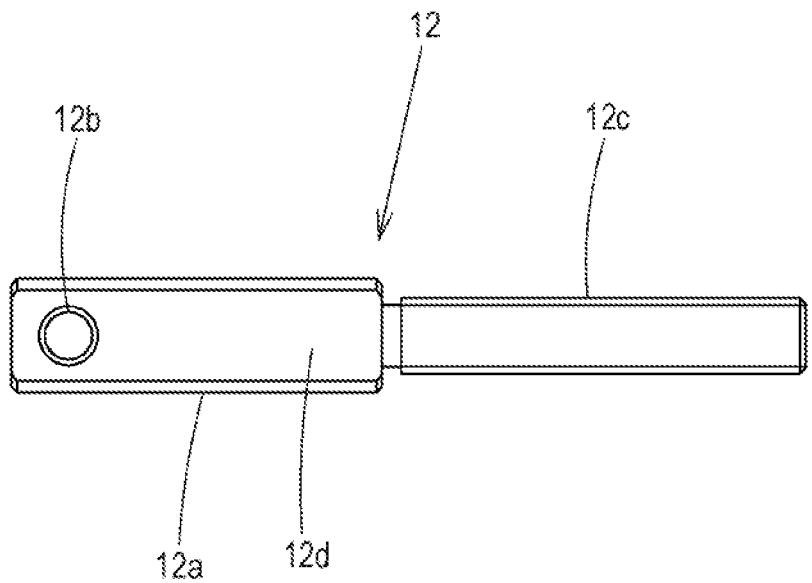
FIG. 5A is a plan view illustrating a tightening screw of the embroidery frame according to the embodiment of the present invention.
Figure 5B:
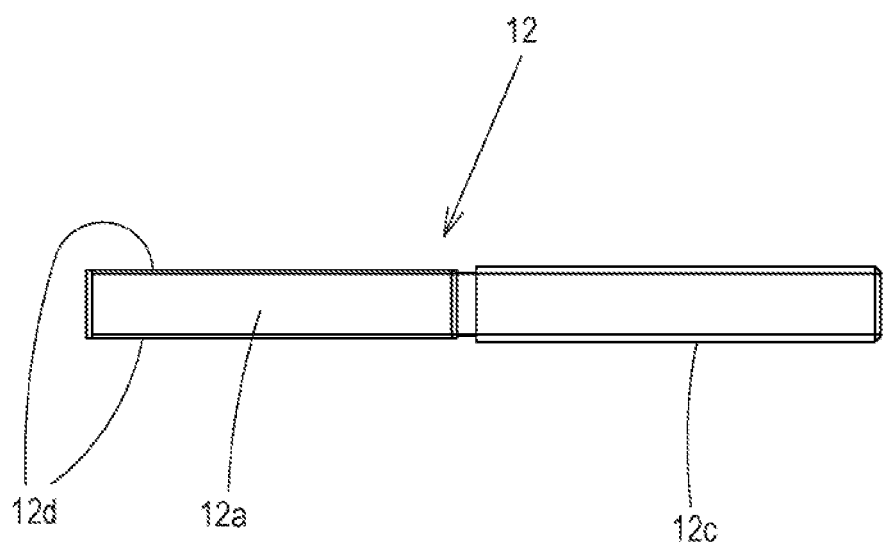
FIG. 5B is a front view illustrating the tightening screw of the embroidery frame according to the embodiment of the present invention.
Figure 5C:
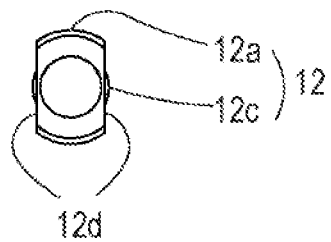
FIG. 5C is a side view illustrating the tightening screw of the embroidery frame according to the embodiment of the present invention.

As illustrated in FIGS. 5A, 5B, and 5C, the tightening screw 12 has a rotation-prevention portion 12a, a rotation shaft hole 12b, and a threaded portion 12c. The rotation-prevention portion 12a is a left portion of the tightening screw 12 of FIGS. 5A and 5B and has two flat surfaces 12d formed in vertical symmetry with respect to the central axis of the tightening screw 12. The rotation shaft hole 12b is formed perpendicularly to the flat surfaces 12d of left side portion of the tightening screw 12 so as to enable the releasing lever 13 to be mounted therein by using a spring pin 15. The threaded portion 12c is a right portion of the tightening screw 12 and has a thread formed thereon.

As illustrated in FIG. 3, the rotation-prevention portion 12a of the tightening screw 12 is inserted in the first throughhole 5c at the separation section 4, and the threaded portion 12c is inserted in the second throughhole 6b. An adjustment nut 14, which serves as a position-adjusting member, is screwed onto the threaded portion 12c that passes through the cavity 6c formed in the second throughhole 6b.

Figure 6A:
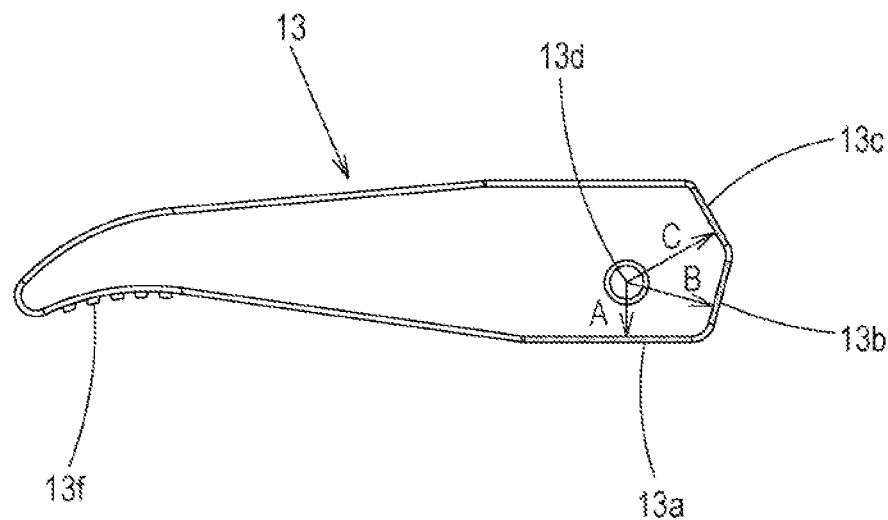
FIG. 6A is a plan view illustrating a releasing lever of the embroidery frame according to the embodiment of the present invention.
Figure 6B:
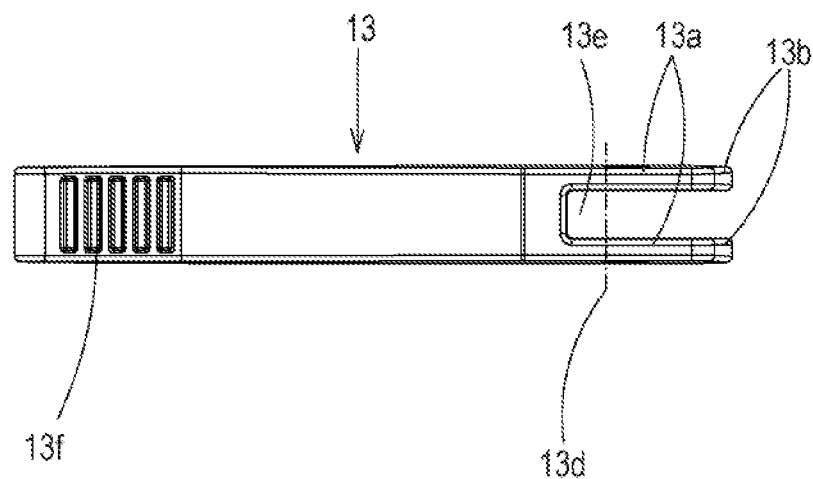
FIG. 6B is a front view illustrating the releasing lever of the embroidery frame according to the embodiment of the present invention.
Figure 6C:
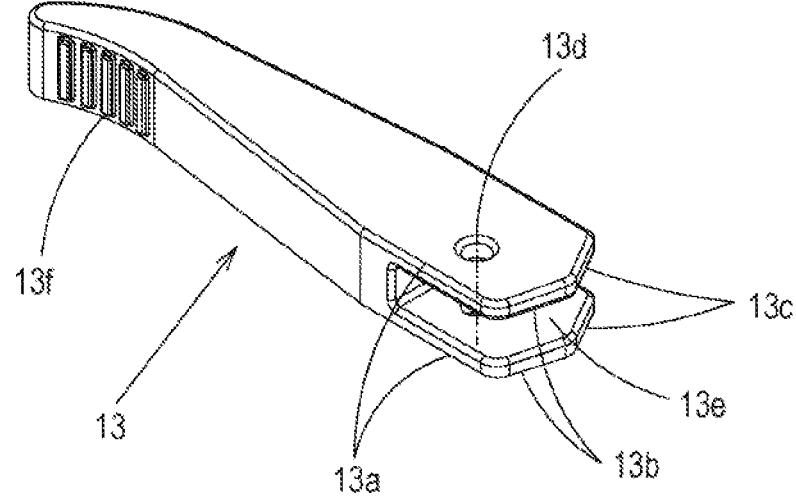
FIG. 6C is a perspective view illustrating the releasing lever of the embroidery frame according to the embodiment of the present invention.

As illustrated in FIGS. 6A, 6B, and 6C, the releasing lever 13 has a tightening-screw accommodation portion 13e, a center of rotation 13d, and a lever portion 13f. The tightening-screw accommodation portion 13e is formed at one end portion (in the right portion) of the releasing lever 13 so as to have a shape like the letter "C" as viewed in a front view. The releasing lever 13 has a throughhole that passes through the tightening-screw accommodation portion 13e, and the throughhole serves as the center of rotation 13d. At the other end portion (i.e., the left portion) of the releasing lever 13, the lever portion 13f is formed into such a shape that enables the lever portion 13f to be pressed easily by the bulb of a finger.

The releasing lever 13 has three flat cam surfaces 13a, 13b, and 13c that are formed around the one end portion of the releasing lever 13 and that have different distances from the center of rotation 13d. The distance from the center of rotation 13d is set such that distance A for the releasing cam surface 13a is smallest, distance C for the full-tightening cam surface 13c is greatest, and distance B for the temporary-tightening cam surface 13b comes in between distance A and distance C. Note that although the releasing lever 13 has three cam surfaces 13a, 13b, and 13c in the present embodiment, the releasing lever 13 may have four or more cam surfaces in such a manner that two or more temporary-tightening cam surfaces are formed between the releasing cam surface 13a and the full-tightening cam surface 13c. This enables the embroidery frame to assume multiple temporarily tightened states in which respective clearances S of the separation section 4 are different.

Figure 7:
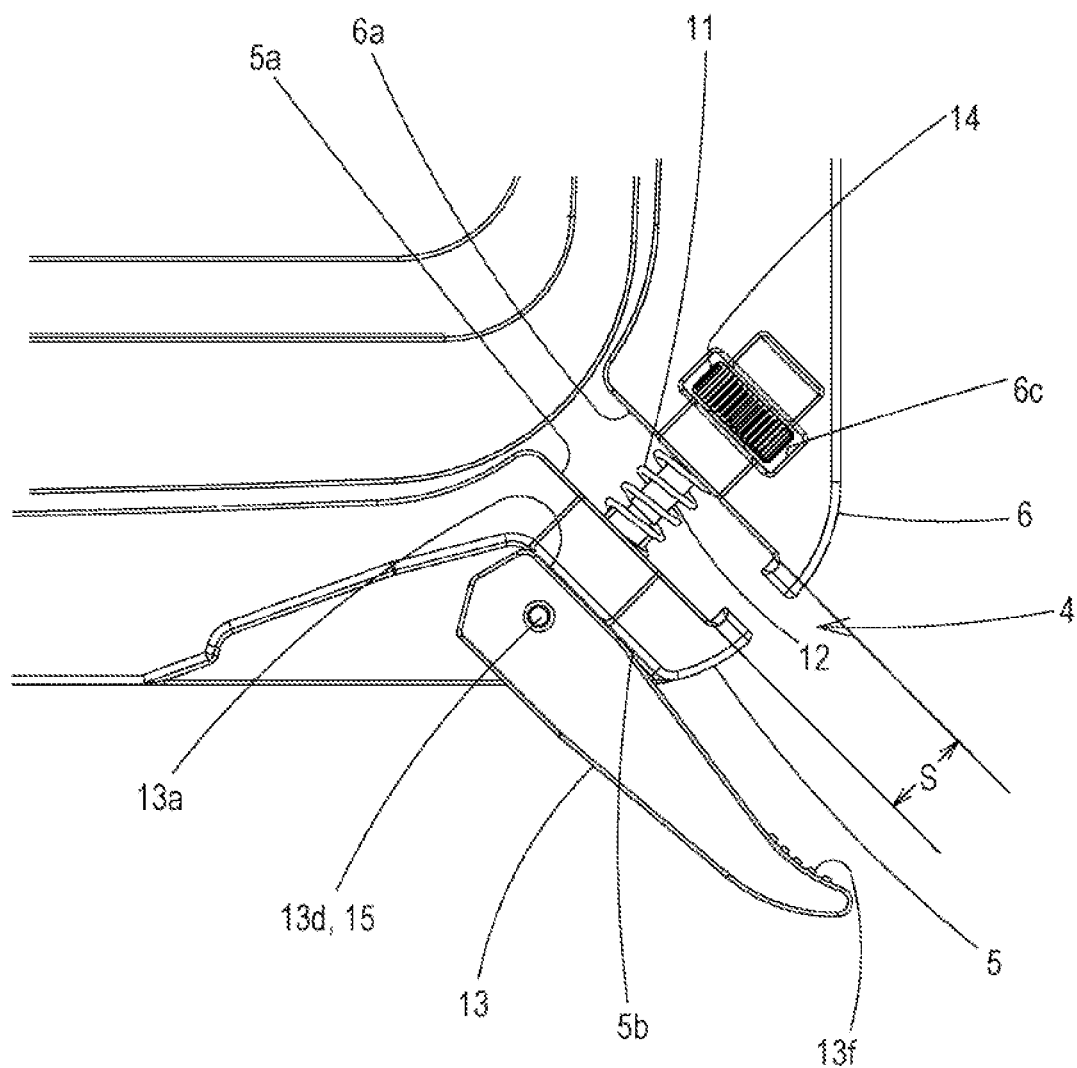
FIG. 7 is a plan view illustrating a released state of the embroidery frame according to the embodiment of the present invention.

Next, operation and advantageous effects of the embroidery frame according to the present embodiment will be described. When an embroidery object is set in the embroidery frame 1 according to the present embodiment, the releasing lever 13 is first turned with a finger being placed on the lever portion 13f of the releasing lever 13 until the releasing cam surface 13a comes into contact with the cam receiving surface 5b of the first end portion 5, as illustrated in FIG. 7. The distance of the releasing cam surface 13a from the center of rotation 13d of the releasing lever 13 is set to be the smallest distance A, and accordingly the clearance S of the separation section 4 becomes greatest.

Here, the helical compression spring 11, which is held by the first end portion 5 and the second end portion 6, urges the first end portion 5 and the second end portion 6 in a direction of increasing the clearance S of the separation section 4. The cam receiving surface 5b of the first end portion 5 is thereby pressed against the releasing cam surface 13a of the releasing lever 13, which causes the releasing lever 13 to stay at this position and causes the outer frame 3 to stay in the state in which the clearance S of the separation portion 4 is greatest. As a result, a gap is created between the outer frame 3 and the inner frame 2, which enables the embroidery object to be set or released easily. In other words, the embroidery frame is in the released state. In this state, the inner frame 2 is first placed over the embroidery object, and then the inner frame 2 and the embroidery object are placed inside the outer frame 3 from above and pushed down until the embroidery object extending at the bottom of the inner frame 2 is brought into contact with the ribs 7 of the outer frame 3.

Figure 8:
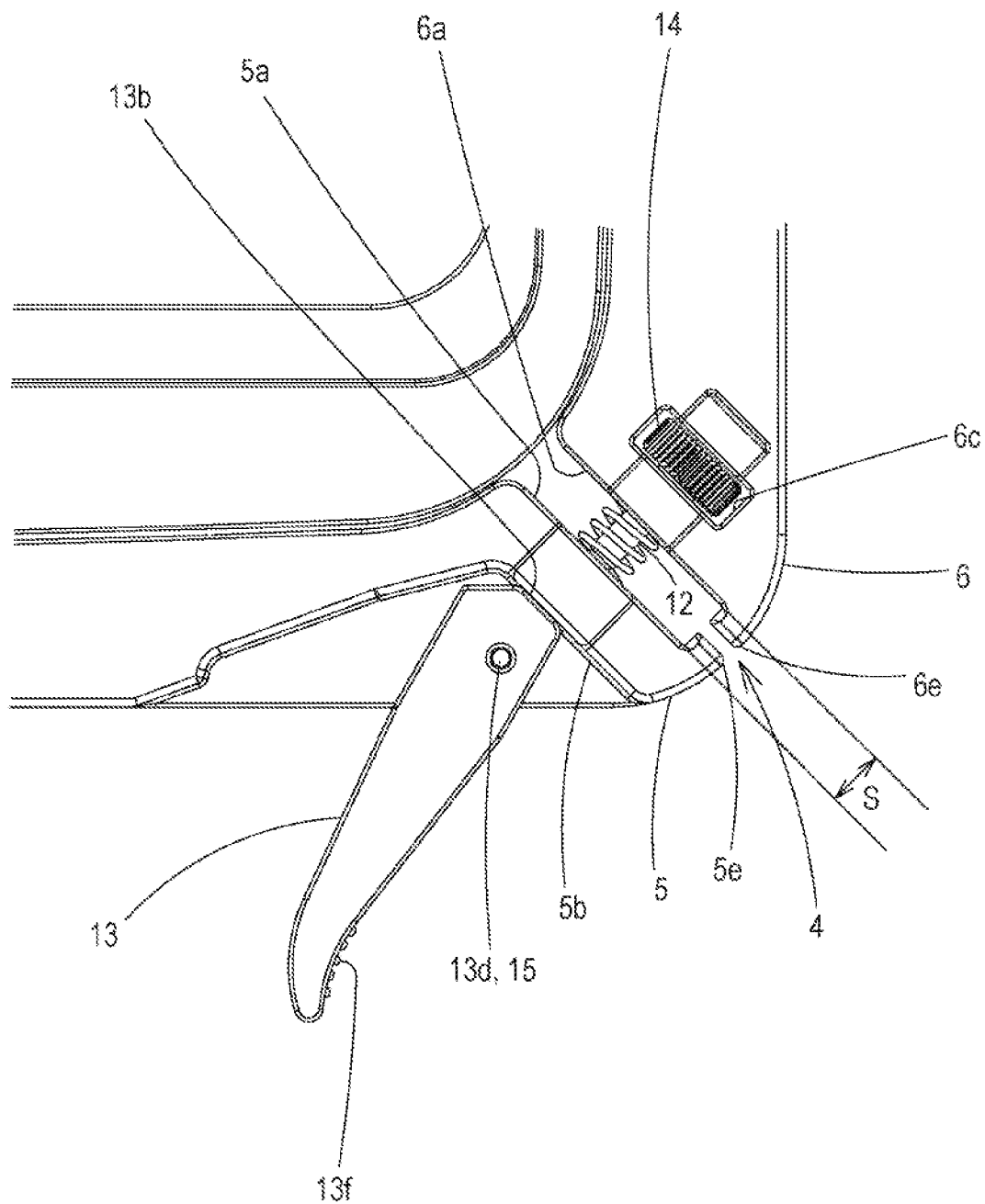
FIG. 8 is a plan view illustrating a temporarily tightened state of the embroidery frame according to the embodiment of the present invention.

Next, the releasing lever 13 is further turned from the state illustrated in FIG. 7 toward the front side portion 3a of the outer frame 3 with a finger being placed on the lever portion 13f of the releasing lever 13. As illustrated in FIG. 8, the temporary-tightening cam surface 13b of the releasing lever 13 is thereby brought into contact with the cam receiving surface 5b of the first end portion 5. The distance of the temporary-tightening cam surface 13b from the center of rotation 13d of the releasing lever 13 is set to be distance B, in other words, an arbitrary distance between the distance of the releasing cam surface 13a and the distance of the full-tightening cam surface 13c. Accordingly, the clearance S of the separation section 4 comes in between the clearances of the released state and the fully tightened state.

Here, the helical compression spring 11 urges the first end portion 5 and the second end portion 6 in the direction of increasing the clearance S of the separation section 4. The cam receiving surface 5b of the first end portion 5 is thereby pressed against the temporary-tightening cam surface 13b of the releasing lever 13, which causes the releasing lever 13 to stay at this position as in the released state. In this state, however, the clearance S of separation section 4 of the outer frame 3 becomes smaller than that in the released state, which narrows the gap between the outer frame 3 and the inner frame 2. This causes the inner frame 2 and the outer frame 3 to nip the embroidery object weakly, which provides an appropriate state for adjusting tension, nipped position, or the like, of the embroidery object.

Figure 9:
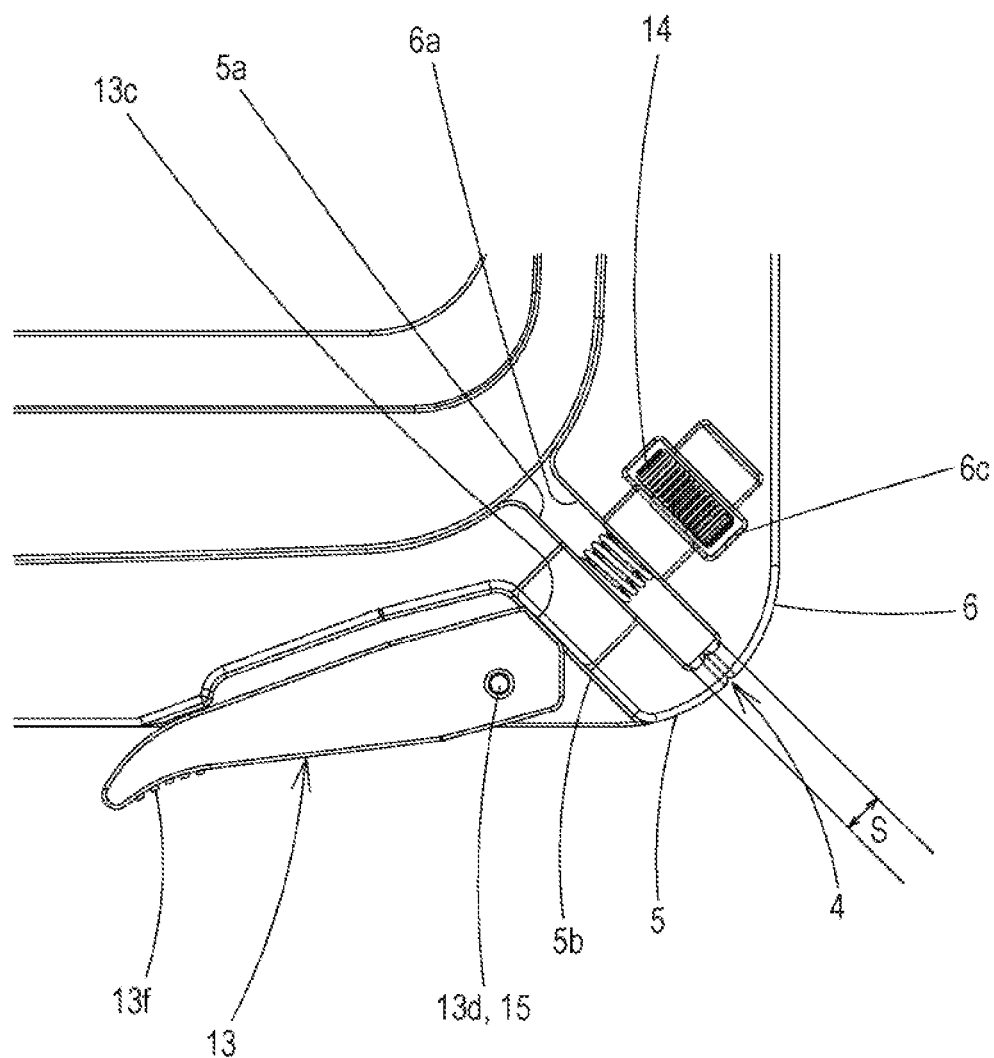
FIG. 9 is a plan view illustrating a fully tightened state of the embroidery frame according to the embodiment of the present invention.

Next, the releasing lever 13 is turned from the state illustrated in FIG. 8 further toward the front side portion 3a of the outer frame 3 with a finger being placed on the lever portion 13f of the releasing lever 13. As illustrated in FIG. 9, the full-tightening cam surface 13c of the releasing lever 13 is thereby brought into contact with the cam receiving surface 5b of the first end portion 5. The distance of the full-tightening cam surface 13c from the center of rotation 13d of the releasing lever 13 is set to be distance C, in other words, set to be the greatest distance. Accordingly, the clearance S of the separation section 4 becomes smallest compared with that in the released state or in the temporarily tightened state.

Here, the helical compression spring 11 urges the first end portion 5 and the second end portion 6 in the direction of increasing the clearance S of the separation section 4. The cam receiving surface 5b of the first end portion 5 is thereby pressed against the full-tightening cam surface 13c of the releasing lever 13, which causes the releasing lever 13 to stay at this position as in the released state or in the temporarily tightened state. In this state, however, the clearance S of separation section 4 of the outer frame 3 becomes smaller than that in the temporarily tightened state. As a result, the gap between the outer frame 3 and the inner frame 2 is closed. This causes the inner frame 2 and the outer frame 3 to nip the embroidery object strongly, which provides an appropriate state for stitching while tension and nipped position of the embroidery object remain unchanged.

In the present embodiment, the first abutting portion 5e and the second abutting portion 6e are formed at the separation section 4 of the outer frame 3 at positions close to the outer periphery of the outer frame 3. Advantageous effects of this are as follows. As illustrated in FIG. 9, the first abutting portion 5e and the second abutting portion 6e are configured to abut each other in the fully tightened state. In the process of the outer frame 3 assuming the fully tightened state by turning the releasing lever 13, the inner peripheral surface of the outer frame 3 first comes into contact with the outer peripheral surface of the inner frame 2. Forces for decreasing the clearance S of separation section 4 of the outer frame 3 tend to act on the first end portion 5 and the second end portion 6 at positions closer to the outer periphery thereof than to the inner periphery, which causes the separation section 4 near the outer periphery to close first. Here, the first abutting portion 5e and the second abutting portion 6e that are positioned close to the outer periphery abut each other. Consequently, the first abutting portion 5e and the second abutting portion 6e serve as the fulcrum, which causes the forces for decreasing the clearance S to act also on the portions closer to the inner periphery.

The following describes advantageous effects of providing the adjustment nut 14 that serves as a position-adjusting member. In the present embodiment, as illustrated in FIGS. 7 to 9, turning the releasing lever 13 around the center of rotation 13d causes the embroidery frame 1 to change the nipping state of the embroidery object from the released state to the fully tightened state. It may be necessary, from time to time, to perform fine adjustment of the clearance S of the separation section 4 depending on the thickness of the embroidery object to be nipped by the embroidery frame 1.

The adjustment nut 14 is rotatably screwed on the threaded portion 12c of the tightening screw 12. The distance between the adjustment nut 14 and the center of rotation 13d of the releasing lever 13 can be adjusted by rotating the adjustment nut 14 without manipulating the releasing lever 13, thereby making fine adjustments of clearance S of the separation section 4.

The embroidery frame according to the present invention is equipped with the manipulation member having three or more cam surfaces of which respective distances from the center of rotation are different from each other. In addition to the released state and the fully tightened state, the embroidery frame can maintain the temporarily tightened state in which tension and position of an embroidery object can be adjusted easily. The embroidery object can be set in the embroidery frame with the tension and position being adjusted simply by manipulating the manipulation member. The embroidery frame can be widely and advantageously applied to sewing machines having the embroidering function or automated embroidering machines.

What is claimed is:

1. An embroidery frame comprising:
   an inner hoop frame;
   an outer frame that has a separation section at which the outer frame is separated so as to form a first end portion and a second end portion that oppose each other, the outer frame being configured to nip an embroidery object, in collaboration with the inner frame, from outside the inner frame; and
   an opening-closing mechanism configured to adjust a clearance of the separation section,
   wherein the opening-closing mechanism comprises:
      a connection shaft that connects the first end portion and the second end portion to each other; and
      a manipulation member that is rotatably mounted on the connection shaft with a center of rotation being positioned at the first end portion, the manipulation member being configured to press the first end portion toward the second end portion,
   wherein the manipulation member has three or more cam surfaces that are each flat in a plan view and configured to press the first end portion toward the second end portion,
   wherein the three or more cam surfaces comprises a releasing cam surface having a first distance from the center of rotation and configured to provide a released state, a temporary-tightening cam surface having a second distance from the center of rotation and configured to provide a temporarily tightened state, and a full-tightening cam surface having a third distance from the center of rotation and configured to provide a fully tightened state,
   wherein the temporary-tightening cam surface is formed between the releasing cam surface and the full-tightening cam surface, and
   wherein, among the first distance, the second distance and the third distance, the first distance is the smallest, the second distance is a distance between the first distance and the third distance, and the third distance is the greatest.

2. The embroidery frame according to claim 1, wherein the connection shaft has a rotation shaft hole formed in a portion of the connection shaft at the first end portion, the rotation shaft hole serving as the center of rotation of the manipulation member, and
   the first end portion has a cam receiving surface with which any one of the three or more cam surfaces comes into contact in response to rotation of the manipulation member and also has a first throughhole into which the portion of the connection shaft at the first end portion is inserted.

3. The embroidery frame according to claim 1, wherein the opening-closing mechanism also has a position-adjusting member that is disposed in a portion of the connection shaft at the second end portion and is configured to move the connection shaft in an axial direction thereof.

4. The embroidery frame according to claim 2, wherein the opening-closing mechanism also has a position-adjusting member that is disposed in a portion of the connection shaft at the second end portion and is configured to move the connection shaft in an axial direction thereof.

5. The embroidery frame according to claim 3, wherein the connection shaft has a thread formed on the portion of the connection shaft at the second end portion, and the position-adjusting member has an adjustment nut that is screwed on the thread, and rotation of the adjustment nut moves the connection shaft in the axial direction thereof.

6. The embroidery frame according to claim 4, wherein the connection shaft has a thread formed on the portion of the connection shaft at the second end portion, and the position-adjusting member has an adjustment nut that is screwed on the thread, and rotation of the adjustment nut moves the connection shaft in the axial direction thereof.

7. The embroidery frame according to claim 5, wherein the second end portion has a second throughhole into which the portion of the connection shaft at the second end portion is inserted and also has a cavity from which the adjustment nut is exposed.

8. The embroidery frame according to claim 6, wherein the second end portion has a second throughhole into which the portion of the connection shaft at the second end portion is inserted and also has a cavity from which the adjustment nut is exposed.

9. The embroidery frame according to claim 1, wherein the opening-closing mechanism has an elastic body that is disposed so as to extend between the first end portion and the second end portion and that expands and contracts in a direction in which the clearance of the separation section changes.

10. The embroidery frame according to claim 2, wherein the opening-closing mechanism has an elastic body that is disposed so as to extend between the first end portion and the second end portion and that expands and contracts in a direction in which the clearance of the separation section changes.

11. The embroidery frame according to claim 3, wherein the opening-closing mechanism has an elastic body that is disposed so as to extend between the first end portion and the second end portion and that expands and contracts in a direction in which the clearance of the separation section changes.

12. The embroidery frame according to claim 4, wherein the opening-closing mechanism has an elastic body that is disposed so as to extend between the first end portion and the second end portion and that expands and contracts in a direction in which the clearance of the separation section changes.

13. The embroidery frame according to claim 5, wherein the opening-closing mechanism has an elastic body that is disposed so as to extend between the first end portion and the second end portion and that expands and contracts in a direction in which the clearance of the separation section changes.

14. The embroidery frame according to claim 6, wherein the opening-closing mechanism has an elastic body that is disposed so as to extend between the first end portion and the second end portion and that expands and contracts in a direction in which the clearance of the separation section changes.

15. The embroidery frame according to claim 7, wherein the opening-closing mechanism has an elastic body that is disposed so as to extend between the first end portion and the second end portion and that expands and contracts in a direction in which the clearance of the separation section changes.

16. The embroidery frame according to claim 8, wherein the opening-closing mechanism has an elastic body that is disposed so as to extend between the first end portion and the second end portion and that expands and contracts in a direction in which the clearance of the separation section changes.

\* \* \* \* \*